April 4, 1961 T. H. KERRY 2,978,209
AIRCRAFT GAS-TURBINE POWER PLANT INSTALLATION
Filed Aug. 18, 1958 2 Sheets-Sheet 1
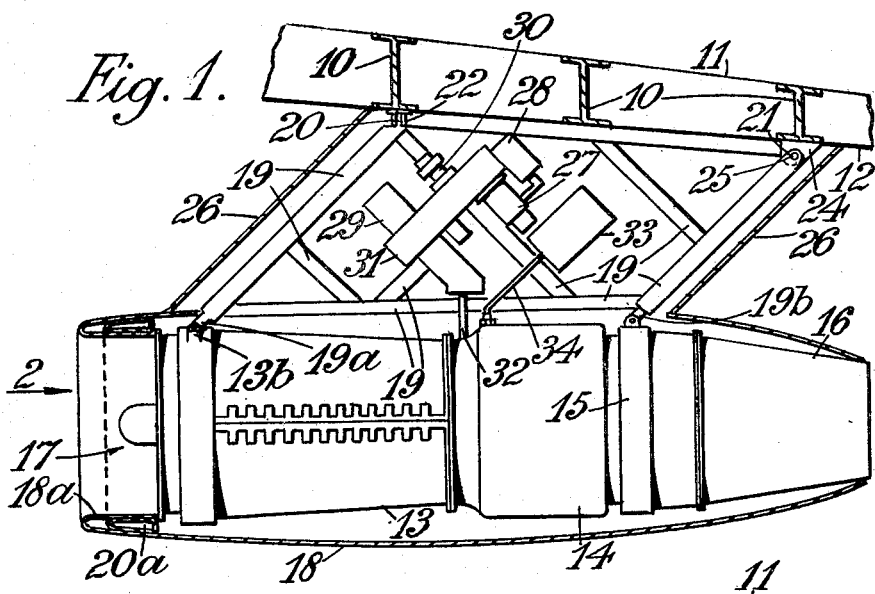
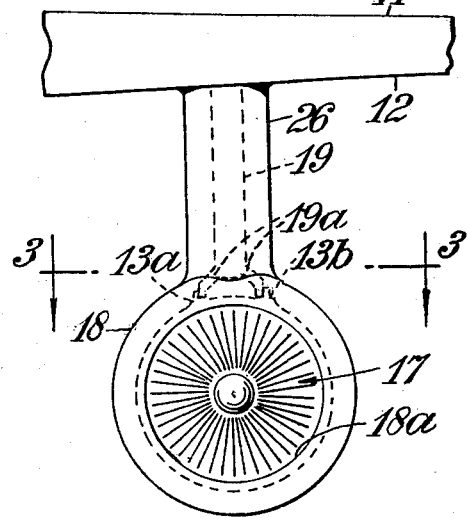
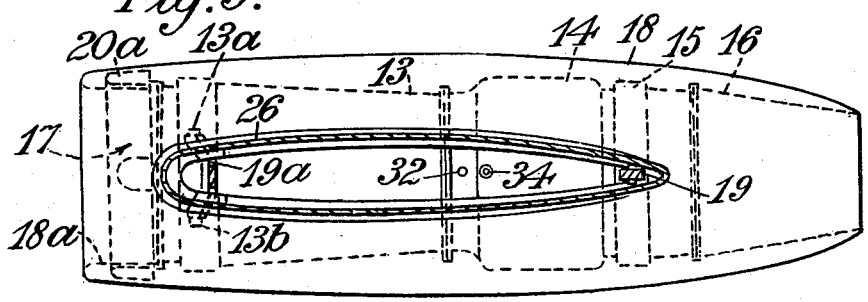

April 4, 1961 T. H. KERRY 2,978,209
AIRCRAFT GAS-TURBINE POWER PLANT INSTALLATION
Filed Aug. 18, 1958 2 Sheets-Sheet 2

United States Patent Office 2,978,209
Patented Apr. 4, 1961

2,978,209
AIRCRAFT GAS-TURBINE POWER PLANT INSTALLATION

Thomas Henry Kerry, Derby, England, assignor to Rolls-Royce Limited, Derby, England, a British company Filed Aug. 18, 1958, Ser. No. 755,643
Claims priority, application Great Britain Sept. 2, 1957
6 Claims. (Cl. 244—54)

This invention comprises improvements in or relating to power plant installations for aircraft.

According to this invention, a power plant installation for an aircraft comprises an aerodynamically-faired strut adapted when in use to project from the aircraft, a jet propulsion engine detachably mounted at the end of the aerodynamically-faired strut structure, and engine auxiliaries, such as fuel pumps, fuel control units, engine-driven electric motors and tachometers, housed within the strut structure, whereby the engine may be faired or shaped to present a low frontal area (as compared with engines having their auxiliaries mounted on them) and the installation may have a low resistance to air flow over it. In such a power plant installation readily disconnectible connections may be provided between the engine and the engine auxiliaries.

The invention also comprises an aircraft having a power plant installation as above set forth with the strut projecting from the main aircraft structure so that the engine is spaced from the main aircraft structure.

Figure 4:
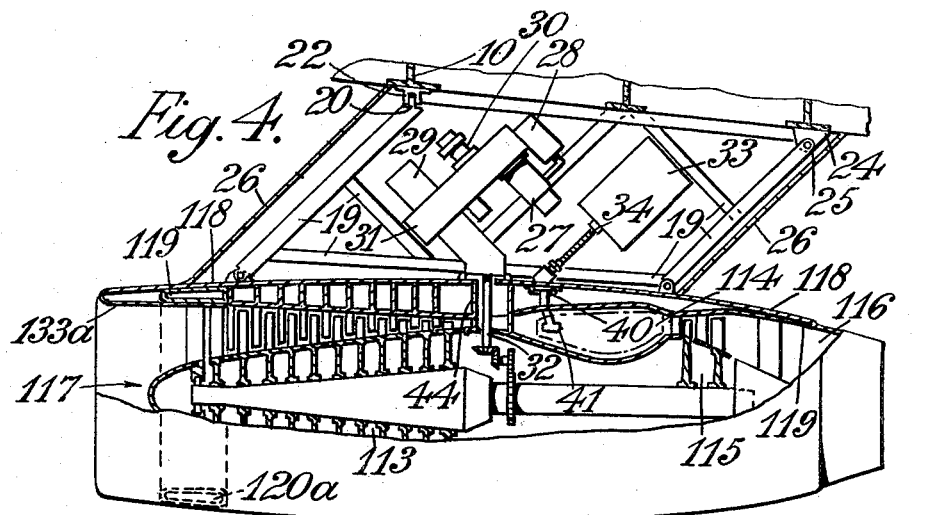
Figure 5:
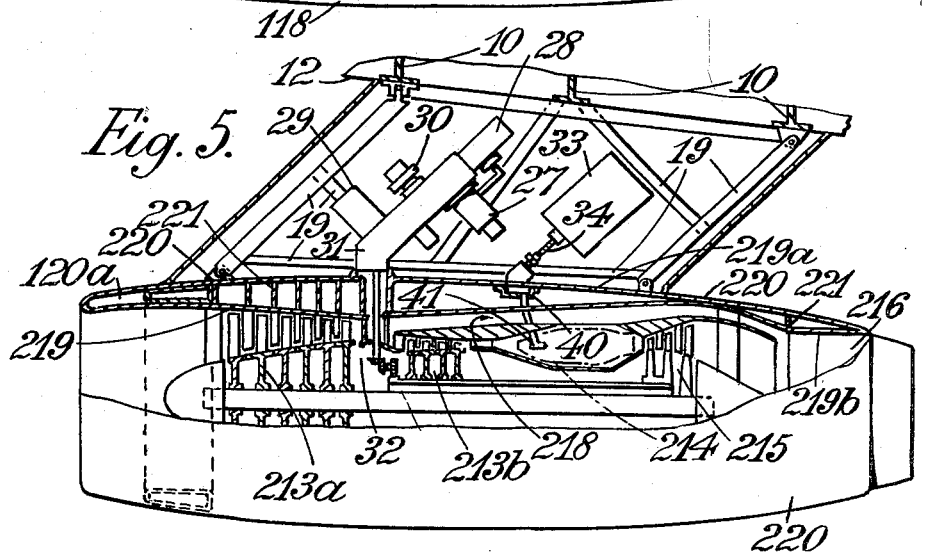

Some power plant installations of this invention will now be described with reference to the accompanying drawings in which:

Figure 1 is a side elevation of one installation, parts being broken away to show details of construction, Figure 2 is a view in the direction of arrow 2 on Figure 1, Figure 3 is a section on the line 3—3 of Figure 2, Figure 4 is a view corresponding to Figure 1 of a second installation, Figure 5 is a view corresponding to Figure 1 of a third installation, and

Figure 6 a detail.

Figures 1 to 3 show an aircraft wing comprising spars 10 and upper and lower skins 11, 12 with a pod-mounted gas-turbine engine power plant installation supported from the wing.

The engine of the installation comprises an axial-flow compressor 13, combustion equipment 14, a turbine 15 and an exhaust assembly 16. Air enters the engine through an air intake 17 and the propulsive jet issues from the after end of the exhaust assembly 16. The engine also comprises a sheet metal outer casing 18 enclosing the casings of the main components 13, 14, 15, 16 of the engine, the casing 18 being shaped aerodynamically to give a low resistance to air flow over the outside of engine. The outer casing 18 is shaped at its forward end to form the wall 18a of the air intake 17.

The installation also comprises a strut structure for supporting the engine in spaced relation to the lower skin 12 of the wing. The strut structure comprises a rigid framework 19 having at its upper end a pair of axially-spaced lugs 20, 21, the lug 20 being detachably secured to a bracket 22 on the underside of one of the spars 10 by a fore and aft extending pin, and the lug 21 being detachably secured to a bracket 24 on the underside of another spar 10 by a transverse pin 25. The strut structure also comprises an aerodynamically-shaped fairing 26 enclosing the framework 19 and housing auxiliaries for the engine.

The engine is detachably mounted on the lower end of the framework 19 by means of axially-spaced mountings, the forward mounting including a splayed frame member 19a attached to the compressor casing at circumferentially-spaced points 13a, 13b, and the rearward mounting 19b being attached to the casing of turbine 15 at a point in the central vertical plane of the engine. The engine outer casing 18 mates with the lower end of the fairing 26 and the casing 18 is cut away below the strut structure to give access between the auxiliaries and the engine. The engine oil sump can be mounted at 20a between wall 18 and wall 18a as shown in Figures 1 and 3.

The auxiliaries shown are supported from the framework 19 and include a main fuel pump 27, a booster pump 28, an electric motor 29 and a tachometer 30. These auxiliaries are grouped about and mounted on the casing of a gear box 31, and are driven from the engine by an engine-driven shaft 32 extending from the engine into the gear-box and by gear drives within the gear-box 31. A fuel supply control unit 33 from which fuel is fed to the engine through pipe 34, is mounted on the framework 19. The drive shaft 32 and the pipe 34 may have readily disconnectible connections with the engine for example as described below in connection with Figure 6.

By employing the space within the strut structure to house the auxiliaries, instead of mounting the auxiliaries on the engine, the frontal area of the pod-mounting and its aerodynamic drag may be reduced as compared with conventional arrangements, since the outer engine casing need have only a relatively small clearance from the casings of the main components 13, 14, 15, 16 of the engine.

In Figure 4, there is shown an installation similar to that of Figures 1 to 3, except that instead of the main components of the engine being enclosed in a sheet metal outer casing, the main casings of the compressor 113, the combustion equipment 114, the turbine 115 and exhaust assembly 116, are double-walled structures, the double walls 118, 119 being interconnected by strengthening webs 120 as necessary. The outer wall 118 is aerodynamically-shaped so that in flight the resistance to air flow over the outer wall 118 is low. As before the auxiliaries are accommodated in the strut structure for supporting the engine from the wing. The air intake passage 117 of the engine is defined by a forward portion 113a of the engine casing.

The installation shown in Figure 5 is similar to that of Figure 4 except that the engine is a by-pass gas turbine engine. The engine has a low-pressure compressor 213a, a high-pressure compressor 213b, combustion equipment 214, a multi-stage turbine 215 for driving the compressors independently of one another, and exhaust assembly 216. Part of the air leaving compressor 213a flows into the inlet of compressor 213b and the remainder flows into an annular by-pass duct 218 which surrounds the combustion equipment 214 and turbine 215, and which opens at its downstream end into the exhaust gas passage through the exhaust assembly 216.

The main casing of the compressor 213a is double-walled the inner wall 219 being extended downstream to form the outer wall 219a of the by-pass duct 218 and the outer wall 219b of the exhaust passage of the assembly 216, and the outer wall 220 being connected to the inner wall 219 by strengthening webs 221 and being aerodynamically shaped to give the engine a low drag.

The engine auxiliaries are housed in the strut structure 19, 26 in the same way as shown in Figure 1, and it will be clear that the installations of Figures 4 and 5 have the same advantages as the installation of Figures 1 to 3.

The engine oil sump can be mounted at 120a as shown in Figures 4 and 5.

In each of Figures 4 and 5, the engine has an annular fuel manifold 40 receiving fuel from pipe 34 and distributing the fuel to fuel injectors 41 in the engine combustion equipment 114, 214.

The manifold 40 (Figure 6) is secured to the inner surface of the outer wall 118 or 220 of the engine casing, and the supply is carried to the manifold 40 through the bore of an externally-threaded hollow boss 42 on the external surface of the wall 128 or 220 and a union connection 43 which is screwed on to the boss to connect one end of the pipe 34 to the boss 42.

Figure 6:
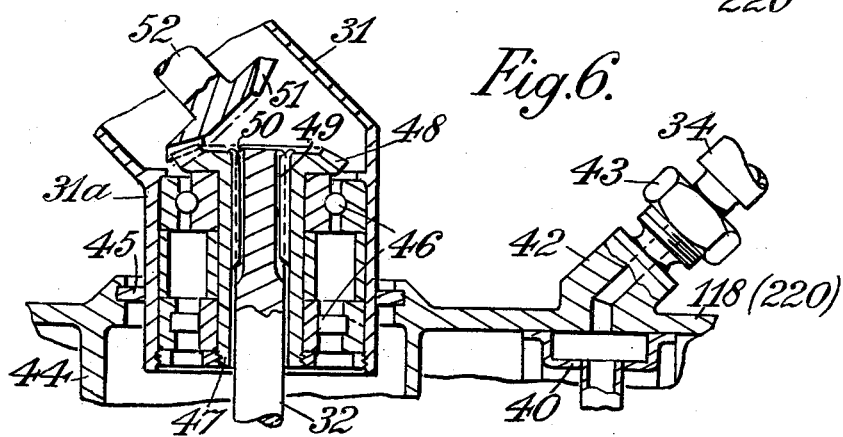

Figure 6 also shows readily disconnectible coupling between the auxiliary drive shaft 32 and the gear-box 31. The gear-box has an extension 31a which projects through an aperture in the wall 118 or 220 into a hollow strut 44 surrounding the shaft 32 and the extension 31a slides in a sealing ring 45 which is retained in a channel in a land surrounding the aperture. The extension 31a houses spaced bearings 46 in which a short hollow spindle 47 is supported, the spindle carrying a bevel gear 48. The spindle 47 has internal axial splines 49 which interengage with splines 50 on the end of the drive shaft 32. The bevel gear 48 meshes with a further bevel gear 51 carried by a drive input shaft 52 for the gear-box 31. When the engine is lowered from the strut structure, the drive connection afforded by the splines 49, 50 is disengaged and likewise the extension 31a slides out from the sealing ring 45.

I claim:

1. A power plant installation for an aircraft comprising an aerodynamically-faired strut structure adapted when in use to project from the aircraft, said strut structure comprising a rigid framework having at one end attachment members by which the strut structure is adapted to be detachably mounted on an aircraft and a fairing enclosing the framework, a jet propulsion engine detachably mounted at the end of the aerodynamically-faired strut structure, and engine auxiliaries supported from said framework and housed within the strut structure, whereby the engine may be faired or shaped to present a low frontal area and the installation may have a low resistance to air flow over it.

2. A power plant installation according to claim 1, comprising a gear-box having a casing, said gear-box being mounted on the framework, and disconnectible driving connection between the engine and the gear-box, the engine auxiliaries being mounted on the casing of the gear-box and being driven by the engine through the driving connection and the gear-box.

3. A power plant installation according to claim 2, wherein said gear box casing has a part slidingly engaging an aperture in the engine casing, and a hollow, internally-splined spindle rotatively supported in the gear-box part, said spindle being the drive input of the gear-box, and the driving connection comprises an engine-driven shaft having a splined end projecting in the hollow-spindle and drivingly engaging the internal splines of the spindle.

4. A power plant installation according to claim 1, comprising a fuel supply control unit mounted on the framework and a readily-detachable fuel supply connection from the unit to the engine.

5. A power plant installation according to claim 4, comprising an annular fuel manifold secured to inner surface of the engine casing, a hollow externally-threaded boss on the outside of the engine casing and having a bore leading to the manifold and a fuel pipe leading from the control unit to the boss and carrying a union piece threaded on the boss.

6. An aircraft having a wing including spar members, a strut structure including a rigid framework and a fairing enclosing the framework, first detachable connections at one end of the structure joining the framework and the spars, the strut structure projecting from the wing, a jet propulsion engine, second detachable connections at the opposite end of the strut structure joining the engine to the rigid framework, engine auxiliaries housed within the fairing of the strut structure and mounted on the rigid framework, and readily disconnectible interconnections connecting the auxiliaries to the engine, the engine having an external casing shaped to have a low frontal area.

References Cited in the file of this patent

UNITED STATES PATENTS

| | | |
|---|---|---|
| 1,391,221 | Tuttle | Sept. 20, 1921 |
| 2,806,351 | Kent | Sept. 17, 1957 |
| 2,863,620 | Vautier | Dec. 9, 1958 |
| 2,928,627 | Johnson | Mar. 15, 1960 |